Figure 1:
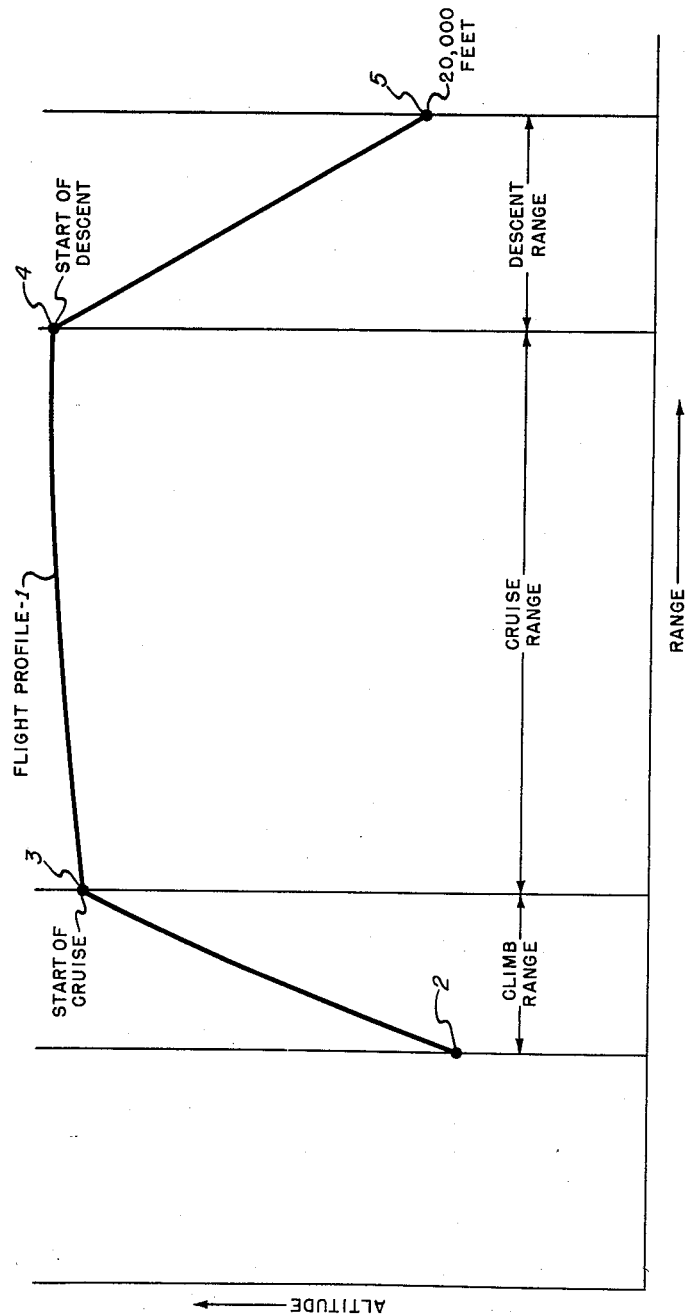

May 7, 1963   R. C. SAUER ET AL   3,088,669
REMAINING RANGE COMPUTER
Filed Jan. 28, 1960   2 Sheets-Sheet 1

INVENTORS
ROBERT C. SAUER
HARRY D. SMITH
BY
ATTORNEY

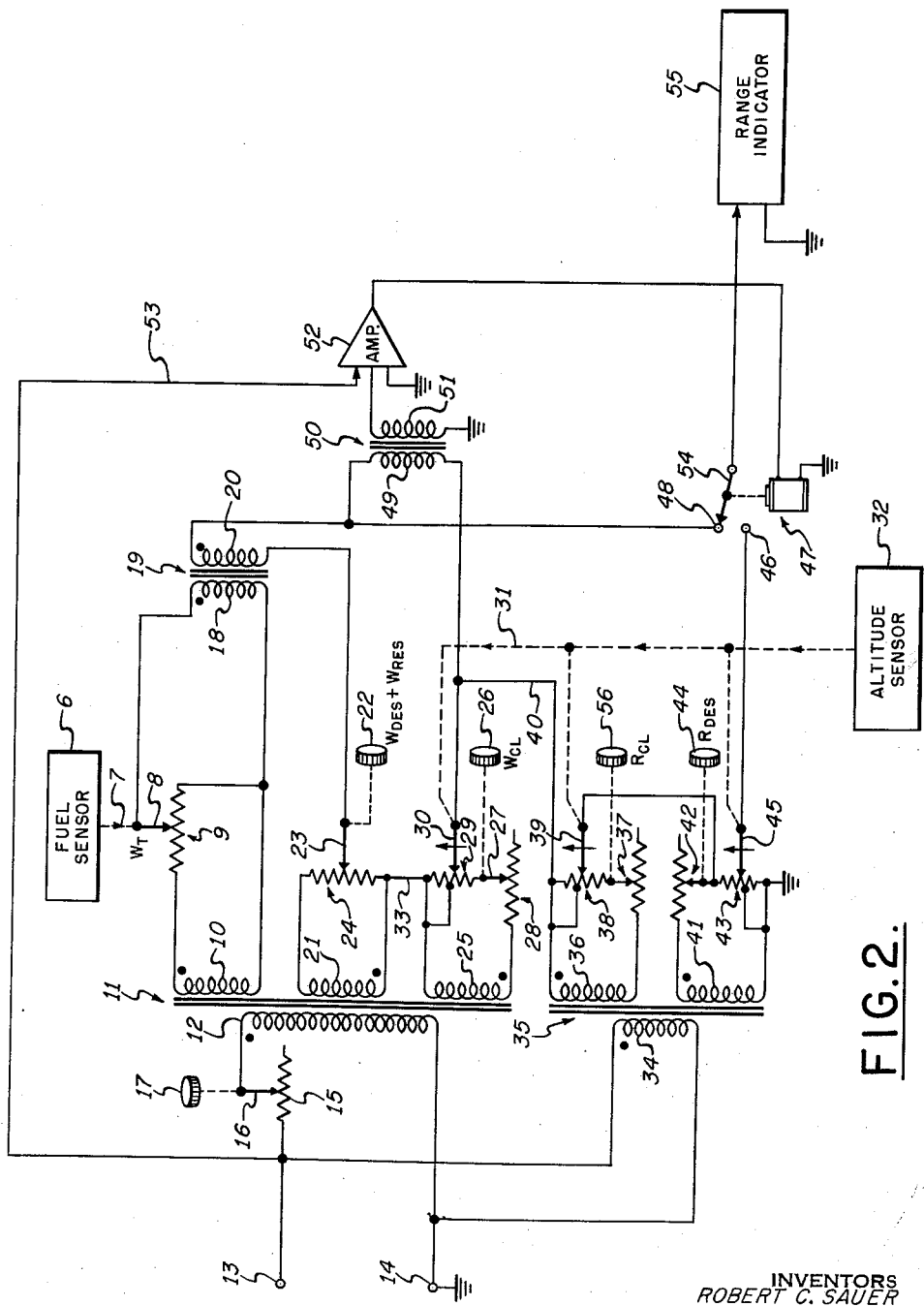

United States Patent Office 3,088,669
Patented May 7, 1963

3,088,669
REMAINING RANGE COMPUTER
Robert C. Sauer, Rosedale, and Harry D. Smith, Massapequa Park, N.Y., assignors to Sperry Rand Corporation, Great Neck, N.Y., a corporation of Delaware
Filed Jan. 28, 1960, Ser. No. 5,284
6 Claims. (Cl. 235—193)

The present invention relates to aircraft navigational aids and, more particularly, to an analog computer for producing an in-flight indication of the ground range equivalent of the remaining fuel.

A problem of constant concern to military aircraft pilots is the difficulty of continuously ensuring that sufficient fuel remains for a safe return to base. Unlike the case with commercial flights, the military aircraft pilot routinely encounters tactical situations which compel the temporary abandonment of any predetermined flight path. In addition to making the split-second decisions required by the immediate tactical situation, the pilot must continuously monitor his remaining fuel, translate the same into remaining range terms and compare the remaining range with the distance to base. The high rate of fuel consumption associated with jet aircraft aggravates the difficulty of instantly making the necessary error-free judgments.

It is the principal object of the present invention to provide means for continuously indicating present aircraft range based upon the amount of fuel remaining.

Another object is to provide apparatus for indicating the remaining range which can be flown from present aircraft position along a predetermined flight profile.

These and other objects of the present invention, as will appear from a reading of the following specification, are achieved in a preferred embodiment by the provision of a remaining range computer adapted to receive input signals representing present amount of fuel and aircraft altitude. Additional data is stored within the computer respecting certain known flight characteristics of the aircraft. The additional data includes the average number of miles than can be flown per pound of fuel at optimum cruising altitude, fuel consumption as a function of altitude in reaching the cruise altitude in a standard climb, the ground range traversed as a function of altitude in reaching the cruising altitude, fuel consumption as a function of altitude in executing a standard descent from the cruising altitude, and ground range traversed during the descent as a function of altitude. Remaining range is continuously computed and indicated to the pilot in response to the remaining fuel and altitude input data signals in combination with the aforementioned stored data.

For a more complete understanding of the present invention, reference should be had to the following specification and to the figures of which:

FIG. 1 is a plot of a representative flight profile upon which the computation performed by the present invention is based; and FIG. 2 is a simplified schematic diagram of a preferred embodiment of the invention.

Referring to FIG. 1, flight profile 1 represents the optimum flight path to be traversed by a high performance aircraft in order to travel a maximum ground distance (range) for a given amount of fuel. It is assumed that an aircraft is situated at an arbitrary point 2 at a given instant. The problem is to compute the range remaining in flight assuming that flight profile 1 is immediately initiated at point 2. The altitude at point 2 is of no especial consequence; it is shown as being somewhat below 20,000 feet for purposes of illustration only.

Flight profile 1 consists of three discrete regions, the first of which (between points 2 and 3) represents a standard military power climb or ascent of the aircraft to cruise altitude. Point 3 represents the initiation of the cruise region of profile 1 which region terminates at point 4. It will be noted that there is a slight continuous increase in altitude along the cruise region in accordance with customary flight procedure. When point 4 is reached, a predetermined descending maneuver is initiated which terminates at point 5 below which the usual aircraft landing approach is made. Point 5 is illustrated as occurring at the representative altitude of 20,000 feet.

The computation performed by the computer of the present invention is set forth by the following equation:

$$R_R = S.R_{AV}(W_T - W_{CL} - W_{DES} - W_{RES}) + R_{CL} + R_{DES}$$

wherein:

$R_R$ = remaining range (miles)
$S.R._{AV}$ = the average specific range factor over the cruise portion of the predetermined flight profile (miles per pound of fuel)
$W_T$ = weight of the total remaining fuel (pounds)
$W_{CL}$ = Weight of fuel used in the climb to cruise altitude (pounds)
$W_{DES}$ = Weight of fuel used in descent from cruise altitude to 20,000 ft. (pounds)
$W_{RES}$ = Weight of fuel in reserve (pounds)
$R_{CL}$ = ground range traversed during the climb to cruise altitude (miles)
$R_{DES}$ = ground range traversed during the descent from cruise altitude to 20,000 ft. (miles).

It will be seen that the solution of the foregoing equation represents the total ground range intervening points 2 and 5 along flight profile 1 of FIG. 1. The equation is solved by the apparatus represented in the simplified diagram of FIG. 2.

Fuel sensor 6 of FIG. 2 produces a mechanical displacement of output shaft 7 for positioning slider 8 of potentiometer 9 in accordance with the weight of the remaining fuel carried by the aircraft. Potentiometer 9 is excited by the alternating signal developed across secondary 10 of transformer 11. Primary 12 of transformer 11 is energized by a source of alternating reference potential (not shown) connected across input terminals 13 and 14. Primary winding 12 of transformer 11 is coupled across input terminals 13 and 14 by means of rheostat 15 having a movable member 16 which is manually positioned by knob 17.

The setting of rheostat 15 by knob 17 establishes the average specific range factor $S.R._{AV}$ of the aforementioned equation. Inasmuch as the wiper 8 of potentiometer 9 is driven in accordance with the weight of the remaining fuel ($W_T$), the alternating potential produced across primary 18 of transformer 19 is proportional in magnitude to the product $S.R._{AV}$ and $W_T$. Said product potential is induced in secondary 20 of transformer 19.

Secondary 21 of transformer 11 is utilized to generate a signal representing the term $$S.R._{AV}.(-W_{DES} - W_{RES})$$

Said term is presumed to be constant for a given aircraft. For this reason, no provision is made for varying the potential representing the term during aircraft flight. The only adjustment required is the initial preflight setting of trimmer knob 22 (to compensate for individual aircraft deviations of $W_{DES}$ and $W_{RES}$) which positions the wiper 23 of potentiometer 24 connected across secondary 21.

Secondary 25 of transformer 11 is utilized to generate a potential representing the term $S.R._{AV}(-W_{CL})$. An initial preflight trimmer adjustment for $W_{CL}$ is made via knob 26 which positions the wiper 27 of rheostat 28.

Rheostat 28, in turn, is connected in series with potentiometer 29 across secondary 25. Potentiometer 29 is wound in accordance with the known fuel consumption vs. altitude characteristic of the aircraft in executing a standard power climb. Wiper 30 of potentiometer 29 is driven by output shaft 31 of altitude sensor 32 as will be described hereinafter. The lower terminal of winding 21 is connected by line 33 to upper terminal of winding 25. The potentials induced in windings 21 and 25 are both opposite in phase to the phase of the potential induced in winding 20.

Primary winding 34 of transformer 35 is coupled across input terminals 13 and 14. Secondary 36 of transformer 35 is utilized to develop a signal representing the term $R_{CL}$. Rheostat 37 and potentiometer 38 are connected in series across winding 36. Potentiometer 38 is wound in accordance with the known range vs. altitude characteristic of the aircraft in executing a standard power climb. Rheostat 37 is adjusted by trimmer knob 56. Wiper 39 of potentiometer 38 is coupled to shaft 31. The upper terminal of secondary 36 is connected to wiper 30 of potentiometer 29 by line 40. Secondary winding 41 of transformer 35 is utilized to produce a potential representing the term $R_{DES}$. Rheostat 42 and potentiometer 43 are connected in series across winding 41. Potentiometer 43 is wound according to the known range vs. altitude characteristic of the aircraft in executing the standard descent between points 4 and 5 along profile 1. Rheostat 42 is adjusted by trimmer knob 44. Wiper 45 of potentiometer 43 is coupled to shaft 31. Wiper 39 of potentiometer 38 is connected to the wiper of rheostat 42. The potentials induced across windings 36 and 41 are of the same phase as the potential induced across winding 20. The lower terminal of winding 41 is grounded. Wiper 45 of potentiometer 43 is connected to terminal 46 of relay 47. Secondary winding 20 of transformer 19 is connected between wiper 23 of potentiometer 24 and contact 48 of relay 47.

It will be seen that the potential at contact 48, with respect to ground, is the algebraic sum of the potential induced in winding 20, the potential developed across the lower portion of potentiometer 24, the potential of upper portion of potentiometer 29, the potential of the upper portion of potentiometer 38, and the potential developed across the entire potentiometer 43. Said algebraic summation fulfills the desired expression:

$$S.R._{AV}(W_T - W_{CL} - W_{DES} - W_{RES}) + R_{CL} + R_{DES}$$

up to the time that the aircraft reaches point 4 along flight profile 1.

It will be noted that the potential at contact 48 of relay 47 varies in accordance with the positioning of wipers 30 and 39 of potentiometers 29 and 38, respectively. Said potential is unaffected by movement of wiper 45 of potentiometer 43. In accordance with the present invention, climb range ($R_{CL}$) is a function only of altitude as the aircraft executes a predetermined power climb; climb range is not treated as a function of the weight of the remaining fuel ($W_T$). It will be noted, however, that the weight of the remaining fuel monitored by sensor 6 inevitably diminishes during the execution of the climb maneuver. The movement of slider 30 of potentiometer 29 in the upward direction indicated by the arrow during the ascent, effectively cancels any potential variation at contact 48 attributable to a reduction in amplitude of the potential induced in winding 20 of transformer 19. The only change in potential at contact 48 during the ascent is due to the altitude-controlled movement of slider 39 of potentiometer 38 representing the term $R_{CL}$.

When the aircraft travels between the cruise altitudes of points 3 and 4 along profile 1, both sliders 30 and 39 of potentiometer 29 and 38 are at their respective zero potential settings. Accordingly, the only change in potential at contact 48 during the cruise portion is due to the change in the remaining fuel quantity $W_T$ as monitored by sensor 6.

Upon the termination of the cruise portion of flight profile 1 at point 4, the remaining fuel ($W_T$) is reduced to the point where it is just equal to the preset descent plus reserve fuel quantities ($W_{DES} + W_{RES}$). As the remaining fuel $W_T$ further decreases during the descent portion of flight profile 1 between points 4 and 5, the phase of the net signal reverses between the upper terminal of winding 20 and wiper 30 of potentiometer 29. Winding 49 of transformer 50 is connected across said terminal and wiper. The reversal in phase of the potential across winding 51 is sensed by phase sensitive amplifier 52. A potential of reference phase is applied to amplifier 52 by line 53 which is connected to input terminal 13. Amplifier 52 is designed in accordance with conventional techniques to produce an output signal for the energization of relay 47 only when the phase of the potential developed across secondary winding 51 is opposite to the phase of the reference potential applied via line 53.

Upon the energization of relay 47 movable member 54 is actuated to the position opposite that shown to connect contact 46 directly to the input of range indicator 55. Solely the potential of wiper 45 of potentiometer 43 is then applied to range indicator 55, said wiper potential representing the term $R_{DES}$. Wiper 45 of potentiometer 43 is driven by altitude shaft 31 so that a zero potential is developed at wiper 45, with respect to ground, when the aircraft reaches point 5 of FIG. 1. The zero range indication then produced by range indicator 55 signifies that the landing maneuver must be initiated. From this point to landing, the pilot's fuel management must be based upon his knowledge of the reserve fuel previously taken into account by the setting of knob 22.

From the preceding specification it can be seen that the objects of the present invention have been achieved by the provision of a computer adapted to receive input data signals representing present aircraft altitude and the weight of the remaining fuel. Said input data signals are combined with stored data signals representing known aircraft performance characteristics along a predetermined flight profile to produce a continuous indication of range remaining in flight along said profile. A zero range indication is produced when the aircraft arrives at a terminal altitude at which the landing approach maneuver must be initiated.

Although the validity of the range indication at any given time depends upon the aircraft following the predetermined flight profile to the destination, departures do not preclude the utility of subsequent indications. The indications again become valid when the pilot resumes flight along the profile.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Aircraft navigation apparatus for producing an output signal representative of range remaining in flight along the ascending and cruising portions of a predetermined flight profile, said profile consisting of ascending, cruising and descending portions, said apparatus comprising first means for generating a first signal proportional to aircraft altitude, second means for generating a second signal proportional to present aircraft fuel quantity, means connected to said first means and responsive to said first signal for generating a third signal proportional to range as a function of present altitude to be traversed in executing said ascending profile portion, means connected to both said first and second means and responsive to said first and second signals for generating a fourth signal proportional to range as a function of present fuel quantity to be traversed during said cruising profile portion, means for generating a fifth signal proportional to the total range to be traversed during said descending profile portion, and means for additively combining said third, fourth and fifth signals to produce said output signal.

2. Aircraft navigation apparatus for producing an output indication representative of range remaining in flight along the ascending and cruising portions of a predetermined flight profile, said profile consisting of ascending, cruising and descending portions, said apparatus comprising first means for generating a first signal proportional to present aircraft altitude, second means for generating a second signal proportional to present aircraft fuel quantity, means connected to said first means and responsive to said first signal for generating a third signal proportional to range as a function of present altitude to be traversed in executing said ascending profile portion, means connected to both said first and second means and responsive to said first and second signals for generating a fourth signal proportional to range as a function of present fuel quantity to be traversed during said cruising profile portion, means for generating a fifth signal proportional to the total range to be traversed during said descending profile portion, means for additively combining said third, fourth and fifth signals to produce a sixth signal, and means for indicating the amplitude of said sixth signal.

3. Apparatus as defined in claim 2 wherein said means connected to both said first and second means includes means for generating a seventh signal proportional to the quantity of fuel as a function of present altitude to be expended in executing said ascending profile portion and means for subtractively combining said second and seventh signals.

4. Aircraft navigation apparatus for producing an output signal representative of range remaining in flight along a predetermined flight profile having ascending, cruising and descending portions, said apparatus comprising first means for generating a first signal proportional to present aircraft altitude, second means for generating a second signal proportional to present aircraft fuel quantity, means connected to said first means and responsive to said first signal for generating a third signal proportional to range as a function of present altitude to be traversed in executing said ascending profile portion, means connected to both said first and second means and responsive to said first and second signals for generating a fourth signal proportional to range as a function of present fuel quantity to be traversed during said cruising profile portion, means for generating a fifth signal proportional to the total range to be traversed during said descending profile portion, means for additively combining said third, fourth and fifth signals to produce a sixth signal, means connected to said first means and responsive to said first signal for generating a seventh signal proportional to range as a function of present altitude to be traversed during said descending profile portion, switching means having two input and one output terminals, said switching means when actuated connecting one of said input terminals to said output terminal and when deactuated connecting the other of said input terminals to said output terminal, means for applying said seventh signal to said one of said input terminals, means for applying said sixth signal to said other of said input terminals, means for generating a reference signal related to the amount of fuel required for executing said descending profile portion, means for comparing said second and said reference signals to produce an eighth signal when said reference signal exceeds said second signal, and means for applying said eighth signal to said switching means for the actuation thereof, said output signal being developed at said output terminal of said switching means.

5. Apparatus as defined in claim 4 wherein said means connected to both said first and second means includes means for generating a ninth signal proportional to the quantity of fuel as a function of present altitude to be expended in executing said ascending profile portion and means for subtractively combining said second and ninth signals.

6. Aircraft navigation apparatus for producing an output indication representative of range remaining in flight along a predetermined flight profile having ascending, cruising and descending portions, said apparatus comprising first means for generating a first signal proportional to present aircraft altitude, second means for generating a second signal proportional to present aircraft fuel quantity, means connected to said first means and responsive to said first signal for generating a third signal proportional to range as a function of present altitude to be traversed in executing said ascending profile portion, means connected to both said first and second means and responsive to said first and second signals for generating a fourth signal proportional to range as a function of present fuel quantity to be traversed during said cruising profile portion, means for generating a fifth signal proportional to the total range to be traversed during said descending profile portion, means for additively combining said third, fourth and fifth signals to produce a sixth signal, means connected to said first means and responsive to said first signal for generating a seventh signal proportional to range as a function of present altitude to be traversed during said descending profile portion, switching means having two input and one output terminals, said switching means when actuated connecting one of said input terminals to said output terminal and when deactuated connecting the other of said input terminals to said output terminal, means for applying said seventh signal to said one of said input terminals, means for applying said sixth signal to said other of said input terminals, means for generating a reference signal related to the amount of fuel required for executing said descending profile portion, means for comparing said second and said reference signals to produce an eighth signal when said reference signal exceeds said second signal, means for applying said eighth signal to said switching means for the actuation thereof, said output signal being developed at said output terminal of said switching means, and means for indicating the amplitude of said output signal.

References Cited in the file of this patent
UNITED STATES PATENTS
2,783,940    Hartman _____ Mar. 5, 1957